(12) United States Patent
Hughes et al.

(10) Patent No.: US 7,334,597 B1
(45) Date of Patent: Feb. 26, 2008

(54) LIQUID/VAPOR BYPASS VALVE

(75) Inventors: Michael F. Hughes, Oklahoma City, OK (US); Paul J. Lutes, Edmond, OK (US); Stephen Seymour, Yukon, OK (US)

(73) Assignee: Corken, Inc., Oklahoma City, OK (US)

( * ) Notice: Subject to any disclaimer, the term of this patent is extended or adjusted under 35 U.S.C. 154(b) by 509 days.

(21) Appl. No.: 10/789,291

(22) Filed: Feb. 27, 2004

Related U.S. Application Data

(60) Provisional application No. 60/450,999, filed on Feb. 28, 2003.

(51) Int. Cl.
*F16K 17/18* (2006.01)

(52) U.S. Cl. .................... 137/115.17; 417/299; 417/308

(58) Field of Classification Search ........... 137/115.16, 137/115.17 I; 417/299 X, 308 X
See application file for complete search history.

(56) References Cited

U.S. PATENT DOCUMENTS 1,897,432 A * 2/1933 Klotzman .............. 137/115.17
3,723,025 A * 3/1973 Coakley ...................... 417/299
4,269,572 A * 5/1981 Nozawa et al. ............. 417/299

* cited by examiner

*Primary Examiner*—Stephen M. Hepperle
(74) *Attorney, Agent, or Firm*—McAfee & Taft

(57) ABSTRACT

Bypass valve assembly that selectively establishes a bypass path for a fluid delivery system and having a body member with a fluid inlet and a bypass fluid outlet, a slidable piston assembly and a slidable cage assembly. Spring members bias the piston assembly and the cage assembly to a closed position to prevent fluid flow from the fluid inlet to the bypass fluid outlet when the delivery pressure is between an upper first threshold pressure value and a lower second threshold pressure value. When the delivery system pressure exceeds the first threshold pressure value, the piston assembly is moved to a first open position that permits fluid flow to the bypass fluid outlet; and when the delivery system pressure is less than the second threshold pressure value, the piston assembly is moved to a second open position to permit fluid flow to the bypass fluid outlet.

15 Claims, 5 Drawing Sheets

LIQUID/VAPOR BYPASS VALVE

RELATED APPLICATIONS

This application claims priority to U.S. Provisional Application No. 60/450,999 filed Feb. 28, 2003, entitled Multi-Phase Valve Assembly.

FIELD OF THE INVENTION

This invention is generally directed to fluid delivery systems and more particularly, but without limitation, to a bypass valve assembly establishing a bypass path when pressure exceeds or falls below set threshold limits.

BACKGROUND

Pressure relief bypass valves are often used in fluid delivery systems to establish a bypass path in the event of an overpressure condition. A typical bypass valve includes a spring-loaded piston seated on an internal orifice of a pump or other system member. The spring biases the piston into a sealed or closed position, and when the system pressure reaches a level sufficient to overcome the preset bias of the spring—sometimes referred to as the differential pressure set point—the piston is lifted from the orifice to allow fluid flow there through.

While effectively compensating for liquid overpressure conditions, bypass valves have not historically aided in the resolution of underpressure conditions, such as when a delivered fluid transitions to a vapor phase and/or entrained air condition. A fluid delivery system of interest is one that is carried out by connecting a hose from a tank of a delivery vehicle to a customer tank. The fluid is typically a liquid/vapor fluid that is pumped and metered from the vehicle to a customer's tank.

In the case of a vaporous fluid, such as hydrocarbon fuels like fuel oil and diesel, government regulations consider the delivery vehicle to constitute the point of sale and prohibit the sale of vapor and/or air, such as can occur should the delivery tank be emptied of liquid and the pump continue operating. Such systems often utilize a positive displacement pump that continues to deliver vapor and/or air after the delivery tank has been emptied of liquid.

Meters in the past were often provided with vapor eliminator stages to prevent the metering of vapor, but such meters have not always been effective as they can be overloaded and do nothing to prevent or alleviate the pumping of the fluid when a transition occurs to the vapor state.

There is therefore a continuing need for a bypass valve that effectively compensates for both overpressure and underpressure conditions, and which accommodates vapor phase conditions in fluid delivery systems. It is to such an improvement that the present invention is generally directed.

SUMMARY OF THE INVENTION

The present invention provides a bypass valve assembly which selectively operates to establish a bypass path for a fluid delivery system, the bypass valve assembly having a housing or body member with a fluid inlet that is connectable to the delivery system and is connectable to a bypass fluid outlet conduit. A slidable piston assembly is supported in the body and is moveable to a one of a closed position, a first open position and a second open position. In the closed position the piston assembly is positioned to prevent fluid flow from the inlet to the bypass fluid outlet.

Also provided are means that bias the piston assembly to the closed position when the pressure in the delivery system is between an upper first threshold pressure value and a lower second threshold pressure value. When the delivery system pressure exceeds the first threshold pressure value, said means moves the piston assembly to the first open position to permit fluid flow to the bypass fluid outlet; and when the delivery system pressure is less than the second threshold pressure value, said means moves the piston assembly to the second open position so that fluid flow is permitted from the fluid inlet through the bypass fluid outlet.

The features, advantages and objects of the present invention will be apparent from reading the following detailed description together with the drawings and claims.

DETAILED DESCRIPTION

Figure 1:
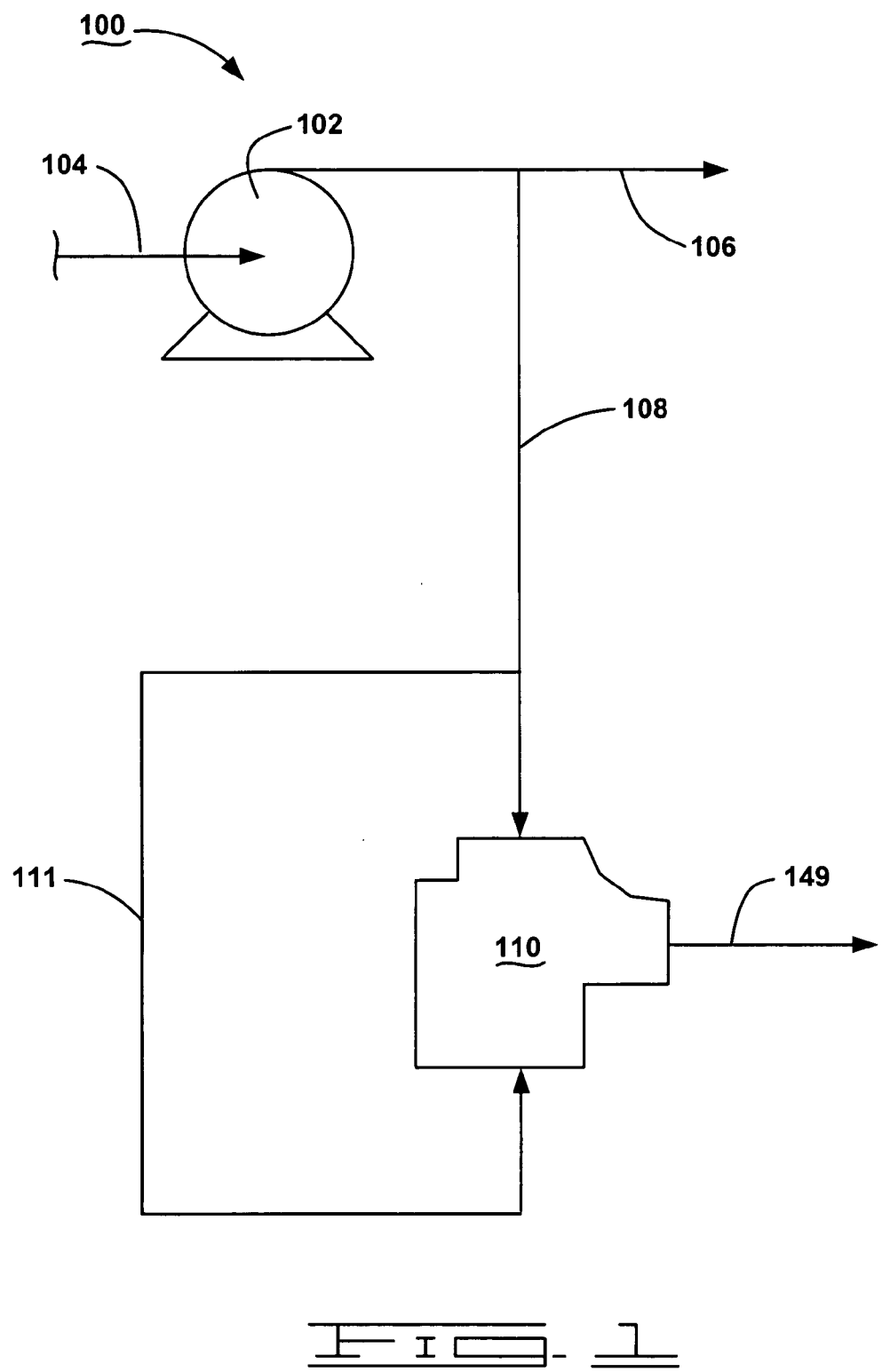
FIG. 1 is a schematic block diagram of a fluid delivery system incorporating the bypass valve assembly of the present invention.

As embodied herein, the present invention is generally directed to a bypass valve assembly that compensates for both liquid overpressure conditions and underpressure conditions in a fluid delivery system, the underpressure condition occurring when a vapor phase of the delivery fluid and/or air is encountered. Reference is first made to FIG. 1, in which is provided a simplified schematic block diagram of a fluid delivery system 100 in which a liquid is delivered from a source vessel to a target vessel. The source vessel typically is a tank on a delivery vehicle, the fluid is a hydrocarbon fuel and the target vessel is a customer tank.

A pump 102 (typically a rotary pump) receives fluid from a suction inlet conduit 104. The pump 102 discharges the fluid to an outlet conduit 106 at a pressure nominally higher than that in the inlet conduit 104. The particular internal configuration of the pump 102 can take a number of forms, and further details of such are omitted for clarity of discussion. For a description of a rotary pump suitable for use as the pump 102 in the fluid delivery system 100, see U.S. Pat. No. 5,921,274 issued to Schuller et al., assigned to the assignee of the present application and incorporated herein by reference. Further, numerous valves, piping and control mechanisms commonly incorporated in fluid delivery systems are omitted herein as a description of such, being well known to those skilled in the art, are believed to be unnecessary for an understanding of the present invention.

A first bypass conduit 108 is in fluid communication with the fluid outlet conduit 106 and is connected to a bypass valve assembly 110. A second bypass conduit 111 is connected by its proximal end to the first bypass conduit 108 and is connected to the bypass valve assembly 110 at its distal end.

Figure 2:
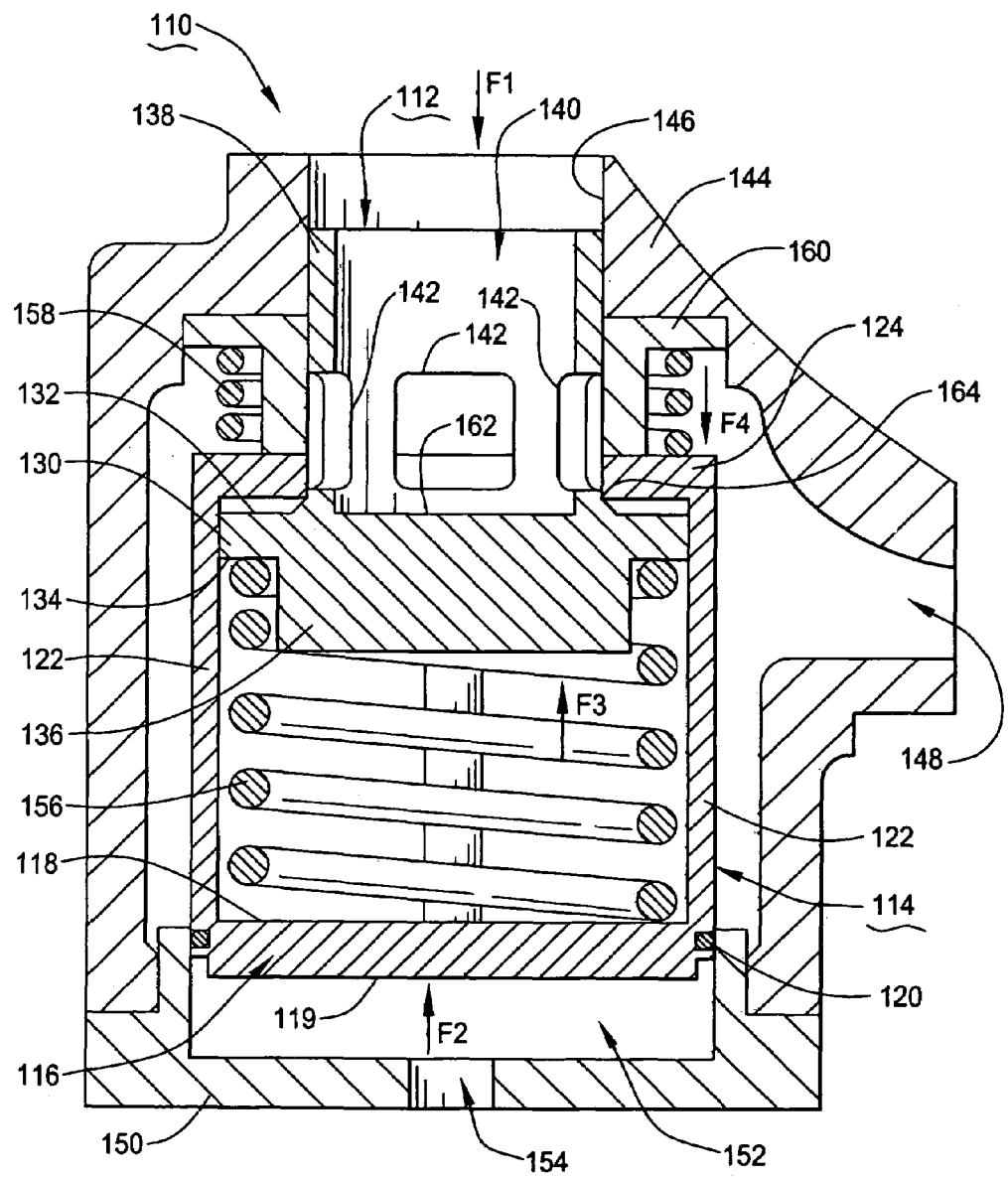
FIG. 2 is a semi-detailed, elevational cross-sectional view of the bypass valve assembly of the present invention.
Figure 3:
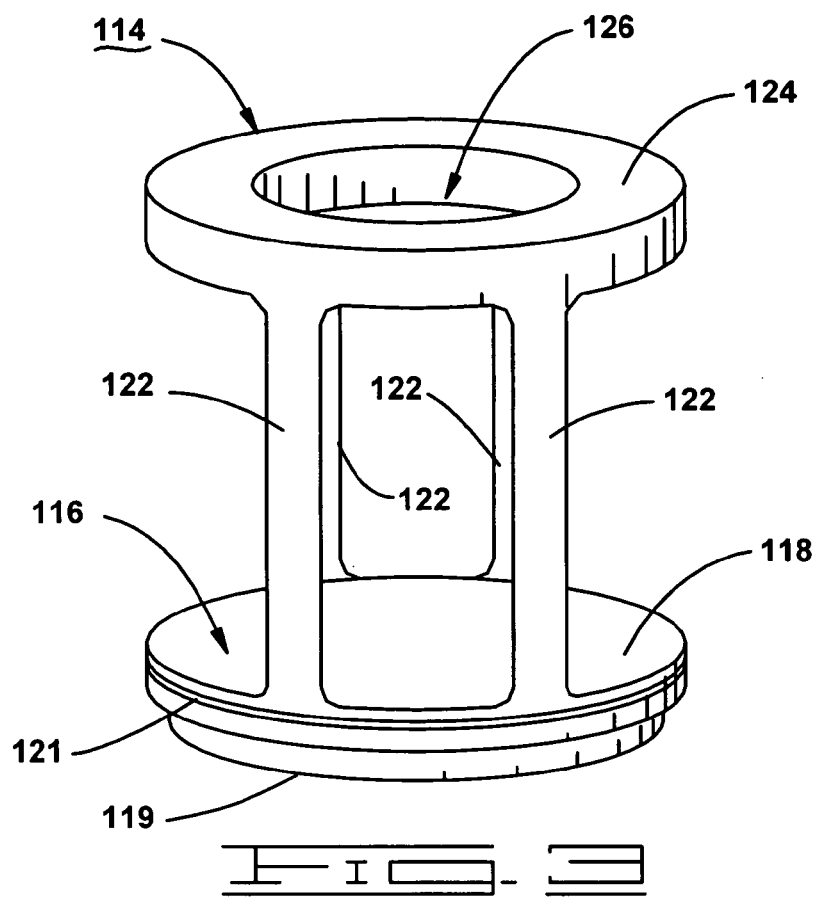
FIG. 3 is a perspective view of the slidable cage assembly of the bypass valve assembly of FIG. 2.
Figure 4:
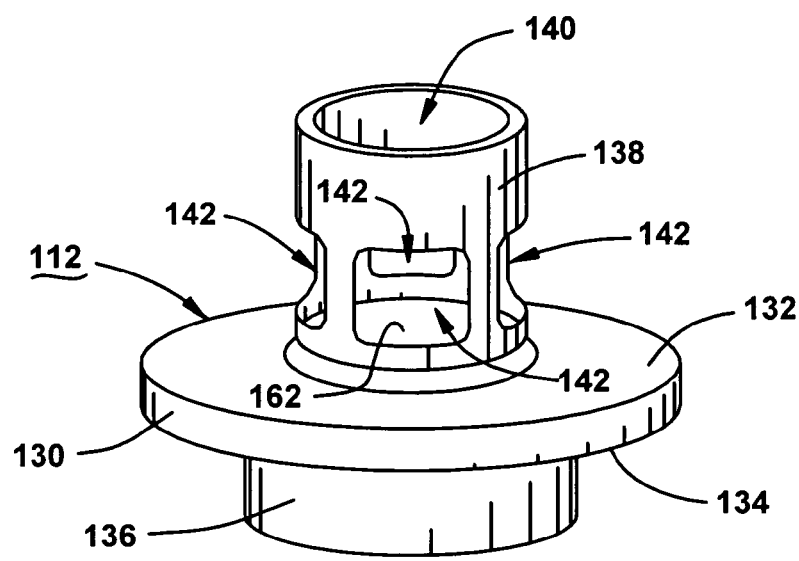
FIG. 4 is a perspective view of the piston assembly of the bypass valve assembly of FIG. 2.

As shown in FIG. 2, the bypass valve assembly 110 has a piston assembly 112 and a slidable cage assembly 114, which are shown individually in FIGS. 3 and 4, respectively. With reference to FIG. 3, the cage assembly 114 is preferably formed from stainless steel or other suitably rigid, durable material. The cage assembly 114 has a plunger member 116 that has opposing surfaces 118, 119, and a circumferentially extending, recessed O-ring seal 120. Standoff flange members 122 project upwardly from the plunger 116 to support an annular collar 124 that has a central orifice 126.

The piston assembly 112, shown more clearly in FIG. 4, is also preferably formed of stainless steel or other suitable, rigid and durable material and is configured to be slidingly supported within the central orifice 126 of the cage assembly 114. The piston assembly 112 includes a disc-shaped base 130 that has opposing seat surfaces 132, 134. A cylindrical spring guide member 136 projects downwardly from the base 124. A cylindrical flow member 138 extends upwardly from the base 124 and includes an entrance orifice 140 and a number of angularly spaced apart exit orifices 142.

The cage assembly 114 and piston assembly 112 are supported in a housing or body member 144, as shown in FIG. 2. The body 144 has an inlet 146 which is connectable to the first bypass conduit 108 to receive pump discharged fluid from the fluid outlet conduit 106 (FIG. 1). The body 144 further includes a bypass outlet 148 in fluid communication with a bypass discharge conduit 149 (FIG. 1). The body has a bonnet portion 150 that seals the lower end of the body 144, forming an interior chamber 152 below the cage assembly 114. The bonnet portion 150 has a pressure inlet orifice 154 communicating with the interior chamber 152 and connectable to the second bypass conduit 111 to assert fluid pressure on the lower surface 119 of the plunger 116.

A coiled first spring 156 has a first end which bears against the top surface 118 of the plunger 116, and a second end which wraps around the spring guide member 136 and bears against the base 130 of the piston assembly 112. A coiled second spring 158 is disposed between an insert 160 in the body 144 and the cage assembly 114 to exert a downwardly directed force on the cage assembly 114.

To explain the configuration of the bypass valve assembly 110 under various operational conditions, the following force values will first be defined. As shown in FIG. 2, force F1 denotes the generally downwardly directed force upon the piston assembly 112 by the fluid pressure at the inlet 146. Force F2 denotes the generally upwardly directed force by the fluid pressure on the lower surface 119 of the plunger 116 by fluid entering the chamber 152 via the pressure inlet orifice 154 and the second bypass conduit 111.

Because the lower surface 119 of the plunger 116 has a substantially larger surface area than that of an interior surface 162 of the piston assembly 112, and the respective fluids provided to the inlet 146 and to the pressure inlet orifice 154 are at nominally the same pressure, the force F2 will generally be substantially greater than the force F1. This will hold true regardless of the particular pressures of the respective fluids at the inlet 146 and the inlet orifice 154.

Force F3 denotes the force exerted by the first spring 156 on the piston assembly 112 with respect to the cage assembly 114. Force F4 denotes the force exerted by the second spring 158 on the cage assembly 114 with respect to the body 144 (via insert 160).

FIG. 2 shows a preferred configuration of the bypass valve assembly 110 during normalized pressure operation of the system 100 as the transported fluid is pumped in a liquid state within a selected operational pressure range. During such operation, the piston assembly 112 remains seated in a closed position (preferably via a metal to metal seal at annular junction 164), effectively sealing off the bypass outlet 148 from the inlet 146. This state is maintained because the following relations are met:

$$F2 > F1 + F4; \text{ and} \qquad (1)$$

$$F3 > F1$$

That is, the force exerted upon the plunger 116 (F2) exceeds the combined force of the inlet fluid against the piston assembly 112 (F1) and the force of the second spring 158 (F4) against the cage assembly 114. Also, the piston assembly 128 remains biased upwardly against the collar 124 of the plunger 116 of the cage assembly 114 because the force of the first spring 156 (F3) exceeds the inlet fluid force (F1).

Figure 5:
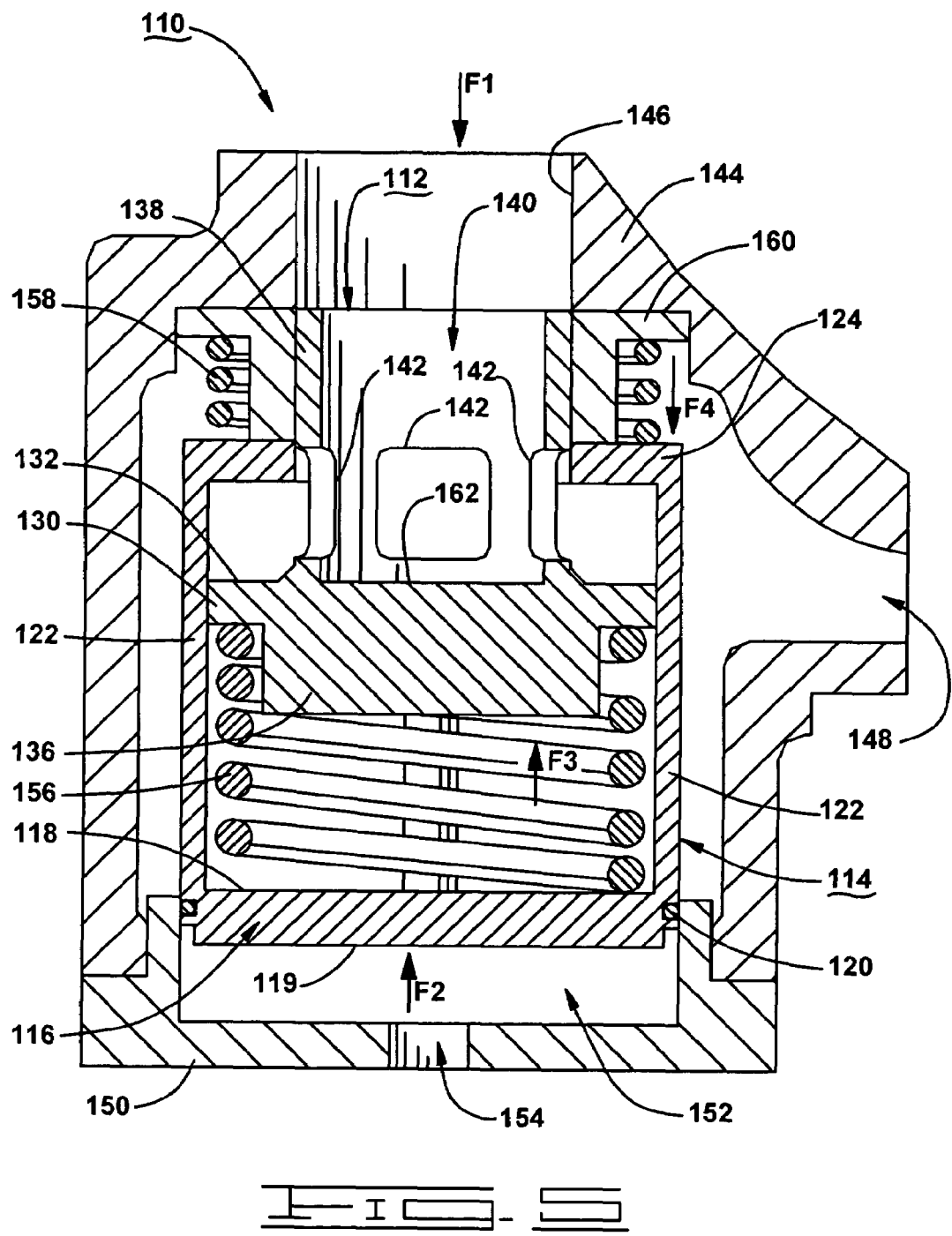
FIG. 5 is a semi-detailed, elevational cross-sectional view of the bypass valve assembly of FIG. 2 during an overpressure condition, the system pressure having exceeded a predetermined upper threshold pressure value.

FIG. 5 shows a preferred configuration of the bypass valve assembly 110 during an overpressure condition of the system during which the transported fluid pumped by the system 100 exceeds a predetermined upper threshold pressure value. During such operation, the piston assembly 112 moves to a first open position, permitting fluid flow through the inlet 146, through the exit orifices 142 of the piston assembly 112, through the cage assembly 114 (via the openings between the standoffs 122) and out the bypass outlet 148. It will be noted that the cage assembly 114 remains positioned as shown in FIG. 2, but the piston assembly 112 has moved relative thereto. This state can be described as follows:

$$F2 > F1 + F4; \text{ and} \qquad (2)$$

$$F1 > F3$$

In this regard, the bypass valve assembly 110 generally operates in a conventional fashion; that is, the force of the inlet fluid (F1) at inlet conduit 146 is sufficient to compress the first spring 156 (which exerts F3) and move the piston assembly 112 downwardly in the body 144 and away from its normally closed position to the first open position.

Figure 6:
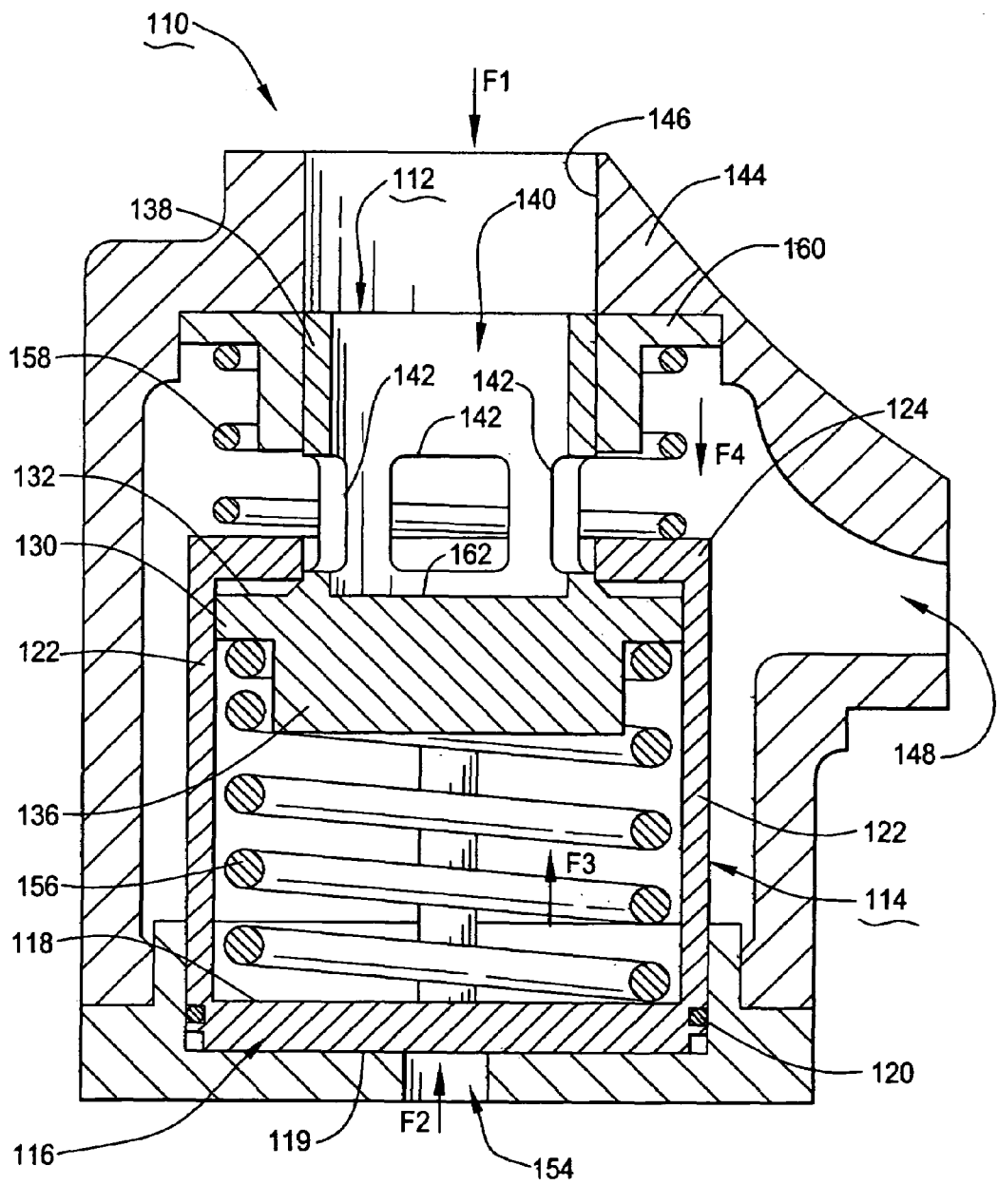
FIG. 6 is a semi-detailed, elevational cross-sectional view of the bypass valve assembly of FIG. 2 during an underpressure condition, the system pressure having dropped to below a predetermined lower threshold pressure value.

FIG. 6 shows a preferred configuration of the bypass valve assembly 110 during an underpressure condition of the system during which the transported fluid pumped by the system 100 falls below a predetermined lower threshold pressure value. For example, as discussed above, this can occur during the transition of a transported pressurized fluid from a liquid state to a vapor state, which will tend to result in a significant drop in the fluid pressure.

Thus, during operation of the valve assembly 110 as depicted in FIG. 6 during a low pressure condition, the piston assembly 112 remains fixed relative to the cage assembly 114, but the piston assembly 112 and the cage assembly 114 advance together downwardly, thereby moving the piston assembly to a second open position in which fluid flow is permitted from the inlet 146 to the bypass outlet 148. Operation of the system under such condition can be described as follows:

$$F4 > F2 - F1; \text{ and} \qquad (3)$$

$$F3 > F1$$

It will be noted that in this condition, the force (F4) of the second spring 158 is sufficient to overcome the difference between the fluid forces F2 and F1, and the plunger 116 moves down to abut the bonnet 150. FIG. 6 also represents the steady state condition of the piston assembly 112 of the bypass valve assembly 110 when no fluid pressure is present (such as during a nonoperational, nonpressurized state of the system 100).

From the foregoing discussion it will be apparent that the relative surface areas of the interior surface of the piston assembly 112 and the lower surface 119 of the plunger 116, and the respective spring forces of the first and second springs 156, 158, are preferably selected to meet the above conditions set forth by equations (1) through (3) for a given upper threshold pressure value and a lower threshold pressure value. While coiled springs (such as 156, 158) have been disclosed as a preferred manner in which to apply biasing forces to the piston assembly 112 and the cage assembly 114, it will be recognized that any number of other methodologies could readily be employed to supply the respective operational forces.

Moreover, while preferred embodiments have contemplated the underpressure condition arising as a result of a transition from a liquid phase to a vapor phase for the transported fluid, such is not limiting to the scope of the invention. Rather, the bypass valve assembly can readily be configured to operate to detect and establish bypass paths for any desired upper and lower pressure thresholds, regardless whether the fluid undergoes a state transition (e.g., from a liquid to a vapor).

Based on the foregoing, it will now be understood that the present invention is generally directed to the above described subject matter, without limitation. While the present invention has been described with the reference to a preferred embodiment thereof, those skilled in the art will appreciate various changes in form and detail may be made without departing from the intended scope of the present invention as defined in the appended claims.

We claim:

1. A bypass valve assembly selectively operated to bypass a delivery fluid, comprising:
    a housing assembly having a fluid inlet, a bypass fluid outlet and a pressure inlet;
    a cage assembly slidably supported within the housing and having a plunger end and a piston retaining end, the plunger end forming with the housing an interior chamber in fluid communication with the pressure inlet;
    a piston assembly slidably supported by the cage assembly;
    first biasing means for biasing the piston assembly to a closed position in which fluid flow is prevented between the fluid inlet and the bypass fluid outlet;
    second biasing means biasing the plunger toward the pressure inlet; and
    wherein the piston assembly is slidable from the closed potion to one of a first open position and a second open position, the piston assembly biased to the closed position when the delivery system pressure is between an upper first threshold pressure value and a lower second threshold pressure value, to the first open position when the delivery system pressure exceeds the first threshold pressure value whereby fluid flow is permitted from the fluid inlet through the bypass fluid outlet, and to the second open position when the delivery system pressure is less than the second threshold pressure value whereby fluid flow is permitted from the fluid inlet through the bypass fluid outlet.

2. The bypass valve assembly of claim 1 wherein the first biasing means comprises:
    a first spring supported in the cage assembly between the plunger end and the piston retaining end.

3. The bypass valve assembly of claim 2 wherein the second biasing means comprises:
    a second spring supported between the housing and the piston assembly.

4. The bypass valve of claim 3 wherein the piston assembly has a sealing surface and the housing assembly has an annular sealing junction.

5. The bypass valve assembly of claim 3 wherein the cage assembly comprises:
    means for sealing between the plunger member and the housing assembly.

6. The bypass valve assembly of claim 5 wherein the piston assembly has at least one exit orifice in fluid communication with the bypass fluid outlet and an interior surface in fluid communication with the fluid inlet, the exit orifice sealed from communicating with the bypass outlet when the piston assembly is in the closed position, and the exit orifice communicating with the bypass outlet when the piston assembly is in either the first or second open positions.

7. A bypass valve assembly selectively operated to bypass a delivery fluid, comprising:
    a housing having a fluid inlet, a bypass fluid outlet and a pressure inlet;
    a cage assembly slidably supported within the housing and having a plunger end and a piston retaining end, the plunger end forming with the housing an interior chamber in fluid communication with the pressure inlet;
    a piston assembly slidably supported by the cage assembly;
    first spring supported in the cage assembly between the plunger end and the piston retaining end for biasing the piston assembly to a closed position in which fluid flow is prevented between the fluid inlet and the bypass fluid outlet;
    a second spring supported between the housing and the piston assembly, the second spring biasing the plunger toward the pressure inlet; and
    wherein the piston assembly is slidable between a closed position, a first open position and a second opened position, the piston assembly preventing fluid flow from the inlet to the bypass fluid outlet in the closed position, the piston assembly biased to the closed position when the delivery system pressure is between an upper first threshold pressure value and a lower second threshold pressure value, to the first open position when the delivery system pressure exceeds the first threshold pressure value whereby fluid flow is permitted from the fluid inlet through the bypass fluid outlet, and to the second open position when the delivery system pressure is less than the second threshold pressure value whereby fluid flow is permitted from the fluid inlet through the bypass fluid outlet.

8. The bypass valve assembly of claim 7 wherein the piston assembly has a sealing surface and the housing assembly has an annular sealing junction.

9. The bypass valve assembly of claim 8 wherein the cage assembly comprises:
    mean for sealing between the plunger member and the housing assembly.

10. The bypass valve assembly of claim 9 wherein the piston assembly has at least one exit orifice in fluid communication with the bypass fluid outlet and an interior surface in fluid communication with the fluid inlet, the exit orifice sealed from communicating with the bypass outlet when the piston assembly is in the closed position, and the exit orifice communicating with the bypass outlet when the piston assembly is in either the first or second open positions.

11. A bypass valve assembly which selectively operates to establish a bypass path for a fluid in a delivery system, comprising:

a body member having a fluid inlet connectable to the delivery system, a bypass fluid outlet and a pressure inlet orifice;

a piston assembly supported within the body member, the piston assembly slidable between a closed position, a first open position and a second open position, the piston assembly preventing fluid flow from the inlet to the bypass fluid outlet in the closed position; and means for biasing the piston assembly in the closed position when the delivery system pressure is between an upper first threshold pressure value and a lower second threshold pressure value, for moving the piston assembly to the first open position when the delivery system pressure exceeds the first threshold pressure value whereby fluid flow is permitted from the fluid inlet through the bypass fluid outlet, and for moving the piston assembly to the second open position when the delivery system pressure is less than the second threshold pressure value whereby fluid flow is permitted from the fluid inlet through the bypass fluid outlet, wherein the means for biasing the piston assembly comprises:

a cage assembly slidably supported in the body member and having a plunger member and annular collar, the plunger member connected to the annular collar by at least one standoff flange member, the plunger collar forming with the body member an interior chamber in fluid communication with the pressure inlet orifice;

means for biasing the piston assembly toward the fluid outlet; and means for biasing the cage assembly toward the pressure inlet orifice.

12. The bypass valve assembly of claim 11 wherein the means for biasing the piston assembly comprises:

a first spring disposed between the piston assembly and the plunger of the cage assembly; and a second spring disposed between the inlet of the body member and the annular collar of the cage member.

13. The bypass valve assembly of claim 12 wherein the piston assembly has a sealing surface and the body member has an annular sealing junction.

14. The bypass valve assembly of claim 13 wherein the cage assembly comprises:

means for sealing between the plunger member and the body.

15. The bypass valve assembly of claim 14 wherein the piston assembly has at least one exit orifice and an interior surface, the exit orifice sealed from communicating with the bypass outlet when the piston assembly is in the closed position, and the exit orifice communicating with the bypass outlet when the piston assembly is in either the first or second open positions.

* * * * *